Figure 1:
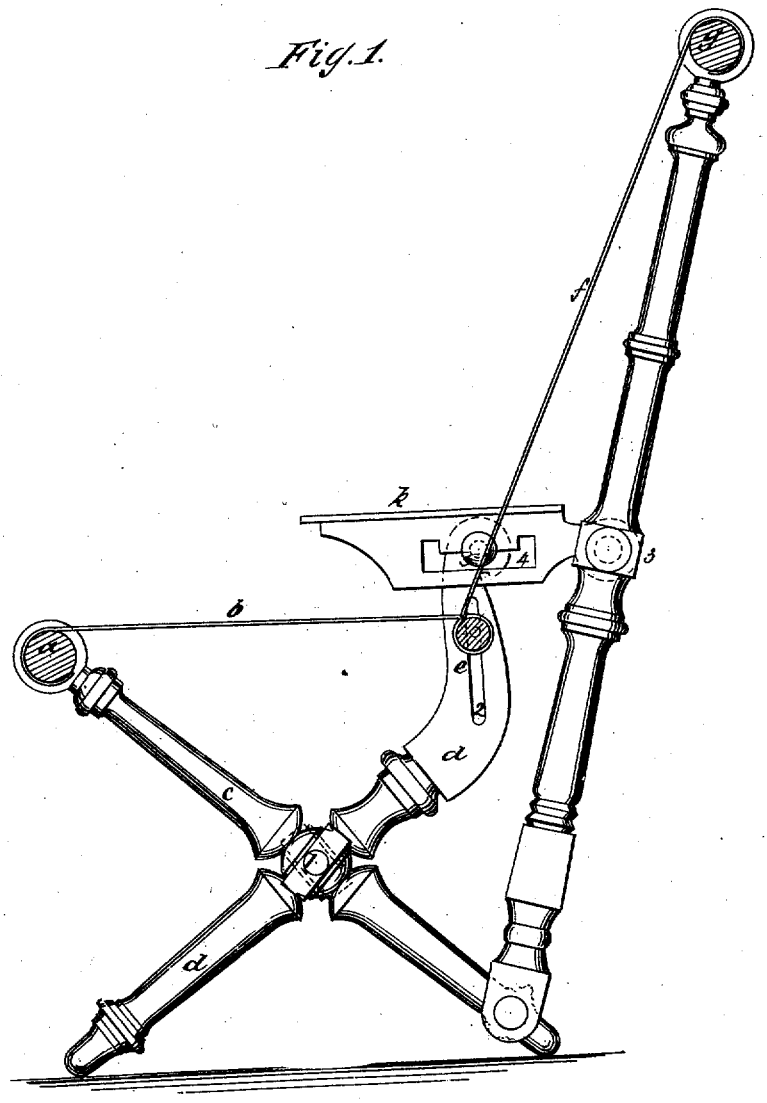

2 Sheets--Sheet 1.

G. HUNZINGER.

Reclining-Chair.

Reissued Sept. 14, 1875.

No. 6,641.

Witnesses:
E. Wolff
Jacob Feibel

Inventor:
George Hunzinger
By attorney
J. N. McIntire

N. PETERS, PHOTO-LITHOGRAPHER, WASHINGTON, D. C.

2 Sheets--Sheet 2.

G. HUNZINGER.

Reclining-Chair.

No. 6,641. Reissued Sept. 14, 1875.

Witnesses:
E. Wolff.
Jacob Gebel

Inventor:
George Hunzinger
By attorney
J. McIntire

N. PETERS, PHOTO-LITHOGRAPHER, WASHINGTON, D. C.

UNITED STATES PATENT OFFICE.

GEORGE HUNZINGER, OF NEW YORK, N. Y.

IMPROVEMENT IN RECLINING-CHAIRS.

Specification forming part of Letters Patent No. 52,416, dated February 6, 1866: reissue No. 6,641, dated September 14, 1875; application filed May 18, 1875.

*To all whom it may concern:*

Be it known that I, GEORGE HUNZINGER, of New York city, in the county and State of New York, have invented certain new and useful Improvements in Folding Chairs; and I do hereby declare the following to be a full, clear, and exact description thereof, reference being had to the accompanying drawings, and to the letters of reference marked thereon.

Previous to my invention it has been customary to make what are known as "camp chairs" or stools, composed of a pair of cross-legs, adapted to turn together on pivots, and a flexible seat attached to bars at the upper ends of said cross-legs; and it has also been suggested to make chairs composed of a pair of cross-legs adapted to slide together, and provided with a back-frame mounted on the cross-legs, and a rigid seat, the whole so arranged as to permit the folding together of the parts to occupy less space during transportation, or for convenience of storage. In all cases, however, with which I am familiar, where it has been suggested to make a folding chair with a back-frame, the construction of the chair has been such as to involve serious practical objections, among which were prominent the following, viz: Great lack of strength in the cross-legs or main supporting-frame, in consequence of the slotting out of one set of said cross-legs, (made necessary by reason of the incapacity in such chairs to fold up without a sliding together of the cross-legs;) second, weakness in the back-frame, in consequence of the longitudinal slats in said frame, located near the junction with said frame of the back side of the seat, (and, consequently, at the very point where the greatest strain comes;) third, an unequal division of the strain or weight on the several parts, and a lack of proper support to the upper part of the back-frame.

To overcome these objections, and at the same time provide for use a chair embracing in its mode of construction, to the greatest practical extent, strength, durability, and economy of manufacture, and in its use comfort to the occupant, and the capacity to fold up into a small compass for storage and transportation, are the main objects of my invention, and to these ends my invention consists:

First, in the combination, with two pairs of legs or leg-frames, pivoted together and provided with a suitable seat, of a back-frame mounted on one pair of the legs, and suitably connected above the points at which it is so mounted to the other parts or portions of the chair, the parts being so arranged that they may be folded up together for packing, and unfolded for use, as hereinafter more fully described.

Second, in the combination, with the two leg-frames or pairs of legs, a back-frame, and a seat and back, of a cross-bar attached to said seat and back, at their junction, and havits ends arranged in slots or grooves in the upper portions of one of said leg-frames, as and for the purposes hereinafter more fully explained.

Third, in the combination, with the back-frame and the seat-frame or leg-frames, of a pair of arms or two arm-pieces, pivoted to the rear upper portions of the seat-frame and to the back-frame, as hereinafter more fully described, and so as to couple the back-frame and the seat-frame together.

Fourth, in so coupling or combining the arms with the seat-frame and back-frame, by means of an adjustable connection, that the said two frames may be set and held at various distances apart, for the purpose of giving the chair different inclinations of back, (and seat,) as hereinafter described.

Fifth, in connecting the back-frame to the seat-frame at a point above the level of the seat, to support and brace the back at said point, as will be hereinafter more fully explained.

To enable those skilled in the art to make and use my invention, I will proceed to describe the construction and operation of a chair embodying it.

Figure 2:
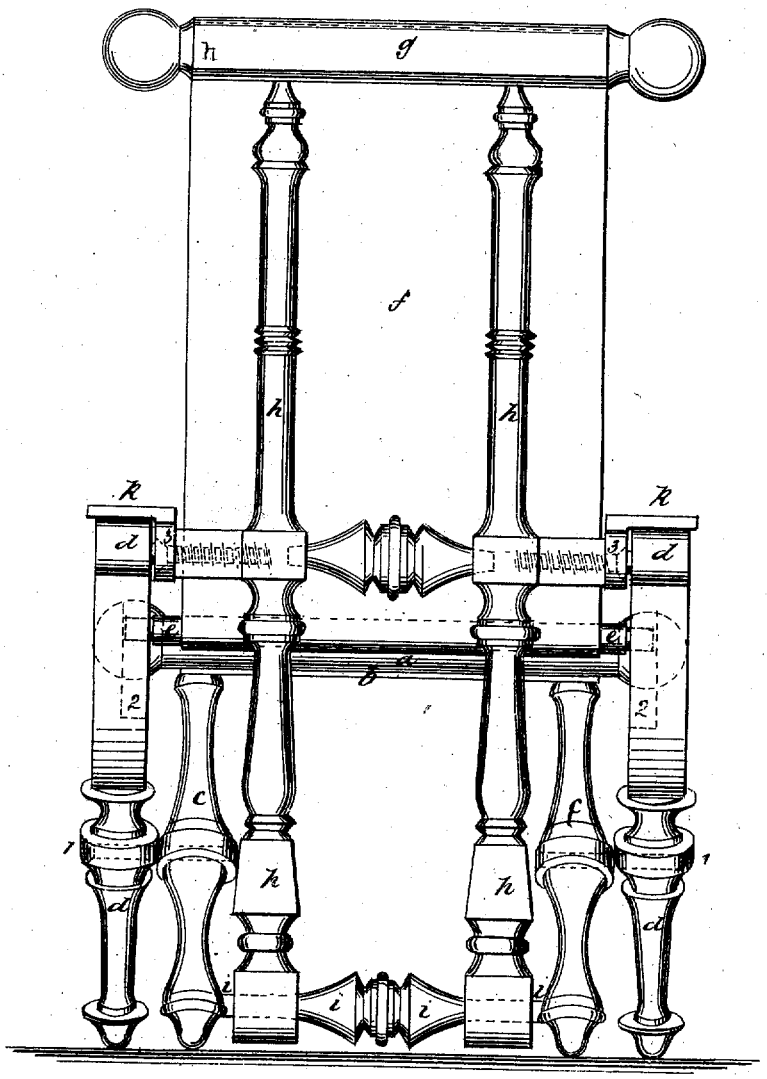

In the accompanying drawings, Figure 1 is a vertical section through the back and seat, and Fig. 2 a back elevation of one of my improved folding chairs.

In the several figures the same part is designated by the same letter of reference.

C C are two leg-pieces, which are connected together at their upper forward ends by a cross-bar, A, and near their lower rear ends by a bar, I, and D D are two other leg-pieces, which are pivoted to the legs C C at the points 1 1, as illustrated, and which, at their upper rear ends, are coupled or connected by arm-pieces K K to a back-frame, H H, which back-frame is mounted at its lower extremity (to turn freely) on the bar I of the leg-frame C C. The arms K K are pivoted, at 3 3, to the back-frame H H, and are connected to the upper ends of the leg-frame D D by means of pins 5 engaging with notches in the upper surfaces of the arm-slots 4 4, as clearly shown at Fig. 1. B is the seat, and F the back, which, at their junction with each other, are secured to a cross-bar, E, the ends of which are set in grooves 2 2 formed in the inner sides of the legs D D, so that it can rise and fall for purposes to be presently explained. The seat B is secured at its front edge to the bar A, and the back F is fastened at its upper extremity to the top cross-bar G of the back-frame.

In the use of my improved chair it is opened out or distended for occupancy into the condition illustrated in the drawings, and when it is desirable to put the structure into a smaller compass, for storage or transportation, the parts are folded up together, so as to occupy a space about equal in length and breadth to the width and length of the back-frame H, and only about double the thickness of said frame.

It will be understood that in a chair made, as shown and described, with the two pairs of cross-legs C and D pivoted together, so as to turn or fold into each other, and a back-frame mounted on the leg-frame, and free to turn on the bar I, not only is the whole weight of the occupant thrown onto the leg-frames, but these frames are unimpaired in strength by any cutting away in their lower portions below the point of pivotal connection; and it will also be seen that by the employment of the bar E, arranged in the grooves 2, and having the back and seat secured to it at their junction, the sitting and reclining weight of the occupant of the chair is distributed onto the leg-frames and back-frame.

By this arragement, also, the inclination of the back-frame may be varied, and the back F and seat B be kept taut in the different positions to which they are shifted by the adjustment of said back-frame.

The pivotal attachments of the arms, with the back-frame and seat-frame, permits the folding up together of the parts, while at the same time the back-frame is not weakened by any cutting away or slotting out for the accomplishment of such folding up, and this advantage, it will be understood, will be possessed by any chair involving the feature of construction here alluded to, whether the cross-bar E be arranged to move or not, and whether the other parts of the chair be made as described, or otherwise. By making the connection between the arms and the seat-frame adjustable I am enabled to set the back-frame and hold it at different degrees of inclination or obliquity.

A very great advantage is gained by extending one pair of the legs, or one of the leg-frames, upward above the seat some distance, and coupling the back-frame to the seat-frame at such elevated point, in lieu of supporting or holding the back-frame at a point about coincident with the level of the seat, because the back-frame is thus tied to the seat-frame at a point nearer to that at which the back-pressure is exerted on it by the occupant of the chair.

Having fully described the construction and operation of and pointed out the distinguishing features of novelty and advantages in my improved folding chair, what I claim therein as new, and desire to secure by Letters Patent, is—

1. The combination, with the leg-frames, or two pairs of legs pivoted together, and provided with a suitable seat, of a back-frame, mounted at its lower end on one of the leg-frames, and suitably connected above to other portions of the chair, substantially as and for the purpose described.

2. The combination, with the two leg-frames, a back frame, and a seat and back, of a cross-bar attached to said seat and back at their junction, and having its ends arranged in grooves 2 2 in one of the leg-frames, substantially as and for the purposes described.

3. The combination, with the back-frame and the two leg-frames, of arms K K, or their equivalents, pivoted to the rear upper portions of one of the leg-frames and to the back-frame, as and for the purposes described.

4. In combination with the leg-frames, back-frame, and connecting-arms K K, means for varying or adjusting the arms relatively to the leg-frame to set and hold the back at different inclinations, as set forth.

5. A seat-frame, having one set of its cross-legs extended upward above the level of the seat, in combination with a back-frame which is coupled or connected to said seat-frame above the level of the seat, all substantially as and for the purpose described.

In testimony whereof I have hereunto set my hand and seal this 25th day of April, 1875.

GEO. HUNZINGER. [L. S.]

In presence of—

JAMES A. HUDSON,
JOHN A. WRIGHT.